United States Patent
Zhou et al.

(10) Patent No.: US 12,512,667 B2
(45) Date of Patent: Dec. 30, 2025

(54) ASYMMETRIC BIDIRECTIONAL SURGE PROTECTION DEVICE

(71) Applicant: Littelfuse Semiconductor (Wuxi) Co., Ltd., Wuxi (CN)

(72) Inventors: Jifeng Zhou, Wuxi (CN); Tsung-Wen Mou, Wuxi (CN)

(73) Assignee: Littelfuse Semiconductor (Wuxi) Co., Ltd., Wuxi (CN)

( * ) Notice: Subject to any disclaimer, the term of this patent is extended or adjusted under 35 U.S.C. 154(b) by 202 days.

(21) Appl. No.: 18/526,607

(22) Filed: Dec. 1, 2023

(65) Prior Publication Data
US 2024/0222961 A1 Jul. 4, 2024

(30) Foreign Application Priority Data
Dec. 30, 2022 (CN) .......................... 202211720758.3

(51) Int. Cl.
*H02H 9/04* (2006.01)
(52) U.S. Cl.
CPC .................................. *H02H 9/041* (2013.01)
(58) Field of Classification Search
CPC ............ H02H 9/041; H02H 9/02; H10D 8/80; H10D 89/713; H10D 89/711; H10D 89/931; H10D 89/611; H01L 23/62
USPC ......................................................... 361/118
See application file for complete search history.

(56) References Cited

U.S. PATENT DOCUMENTS

| | | | |
|---|---|---|---|
| 3,904,931 A * | 9/1975 | Leidich | H02H 9/041 361/111 |
| 4,912,589 A * | 3/1990 | Stolarczyk | H02H 9/04 337/28 |
| 11,641,103 B2* | 5/2023 | Song | H03K 17/731 361/118 |
| 2005/0245006 A1* | 11/2005 | Tseng | H10D 62/126 257/E29.337 |
| 2008/0079020 A1* | 4/2008 | Kao | H10D 8/80 257/E29.337 |
| 2008/0192394 A1* | 8/2008 | Harris | H02H 9/025 361/111 |
| 2009/0230426 A1* | 9/2009 | Carpenter, Jr. | H10D 89/611 257/173 |
| 2011/0058299 A1* | 3/2011 | Simi | H02H 9/042 361/111 |
| 2012/0007207 A1 | 1/2012 | Salcedo | |
| 2012/0170161 A1* | 7/2012 | Lin | H02H 9/046 361/56 |

(Continued)

FOREIGN PATENT DOCUMENTS

| CN | 115497932 A | 12/2022 | |
|---|---|---|---|
| KR | 20190122712 A * | 10/2019 | H02H 9/042 |
| WO | WO-2017024577 A1 * | 2/2017 | H02H 9/044 |

OTHER PUBLICATIONS

Extended European Search Report for EP Application No. 23220800.9, dated May 27, 2024, 8 pages.

*Primary Examiner* — Dharti H Patel
(74) *Attorney, Agent, or Firm* — KDW Firm PLLC

(57) ABSTRACT

In one embodiment, an asymmetric bidirectional surge protection device is provided, including a crowbar device, and a clamping device, wherein the crowbar device is formed in a first area of a semiconductor die, and wherein the clamping device is formed in a second area of the semiconductor die, wherein the second area surrounds the first area.

15 Claims, 4 Drawing Sheets

(56) References Cited

U.S. PATENT DOCUMENTS

| | | | | |
|---|---|---|---|---|
| 2012/0250205 | A1* | 10/2012 | Pfitzer | H02H 9/041 |
| | | | | 361/91.1 |
| 2018/0240575 | A1* | 8/2018 | To | H02H 9/041 |
| 2018/0261592 | A1* | 9/2018 | Soejima | H10D 89/921 |
| 2020/0028354 | A1* | 1/2020 | Zhou | H02H 9/005 |
| 2022/0109296 | A1* | 4/2022 | Chin | H03K 17/08142 |
| 2023/0155374 | A1* | 5/2023 | Ikeda | H02H 9/046 |
| | | | | 361/56 |
| 2024/0222961 | A1* | 7/2024 | Zhou | H02H 9/041 |

* cited by examiner

ASYMMETRIC BIDIRECTIONAL SURGE PROTECTION DEVICE

CROSS-REFERENCE TO CORRESPONDING APPLICATIONS

This application claims the benefit of priority to, Chinese Patent Application No. 2022117207583, filed Dec. 30, 2022, entitled "ASYMMETRIC BIDIRECTIONAL SURGE PROTECTION DEVICE," which application is incorporated herein by reference in its entirety.

FIELD

Embodiments relate to the field of circuit protection devices, and more particularly to a semiconductor devices for protection against overvoltage events.

DISCUSSION OF RELATED ART

Semiconductor devices are widely used to provide protection against transient conditions, such as transient overvoltage events or surge events, by taking advantage of the properties of P/N junctions. In the present day there are two main type of discrete circuit protection technologies widely deployed in the market. These may be referred to as crowbar devices and clamping devices. Examples of clamping devices include varistors, such as metal oxide varistors (MOV), as well as transient voltage suppression (TVS) diodes, Zener diodes, and other devices. In either of these devices, voltage may be clamped to a level characteristic of the particular clamping device. A drawback of the use of a clamping device is that the voltage drop across a clamp type component increases as a function of the conducted current passing through the device. Thus, a higher clamping voltage threshold component will have a lower peak current capability.

Crowbar type devices include thyristors, SIDACtors® and the like. In operation, a crowbar device will return to a lower voltage stage when a certain voltage is reached. A crowbar type component is able to handle a much higher surge current because during an on-state condition, the voltage across the crowbar device is extremely low. Protection devices that combine the properties of a crowbar device and a clamping device are possible, but as yet, such designs are not optimized.

It is with respect to these and other issues the present disclosure is provided.

SUMMARY

In one embodiment, a surge protection device is provided. The surge protection device may include a crowbar device, and a clamping device, wherein the crowbar device and the clamping device are formed within a semiconductor die. The crowbar device may be formed in a first area of the semiconductor die, wherein the clamping device is formed in a second area of the semiconductor die that surrounds the first area.

In another embodiment, an asymmetric bidirectional surge protection device is provided. The asymmetric bidirectional surge protection device may include an inner substrate layer, arranged within a semiconductor die, where the inner substrate layer has a first polarity. The asymmetric bidirectional surge protection device may include a first outer layer, disposed between the inner substrate layer and a first main surface of the semiconductor die, where the first outer layer comprises a second polarity. The asymmetric bidirectional surge protection device may further include a second outer layer, disposed between a second main surface of the semiconductor die, and the inner substrate layer, where the second outer layer also has the second polarity. The asymmetric bidirectional surge protection device may further include and a surface layer, comprising the first polarity, where the surface layer is disposed on the first main surface within a first area of the semiconductor die, wherein the surface layer comprises the first polarity and defines a second area of the semiconductor die. As such, the second area of the semiconductor die may surround the first area and does not contain the surface layer.

DESCRIPTION OF EMBODIMENTS

Figure 1:
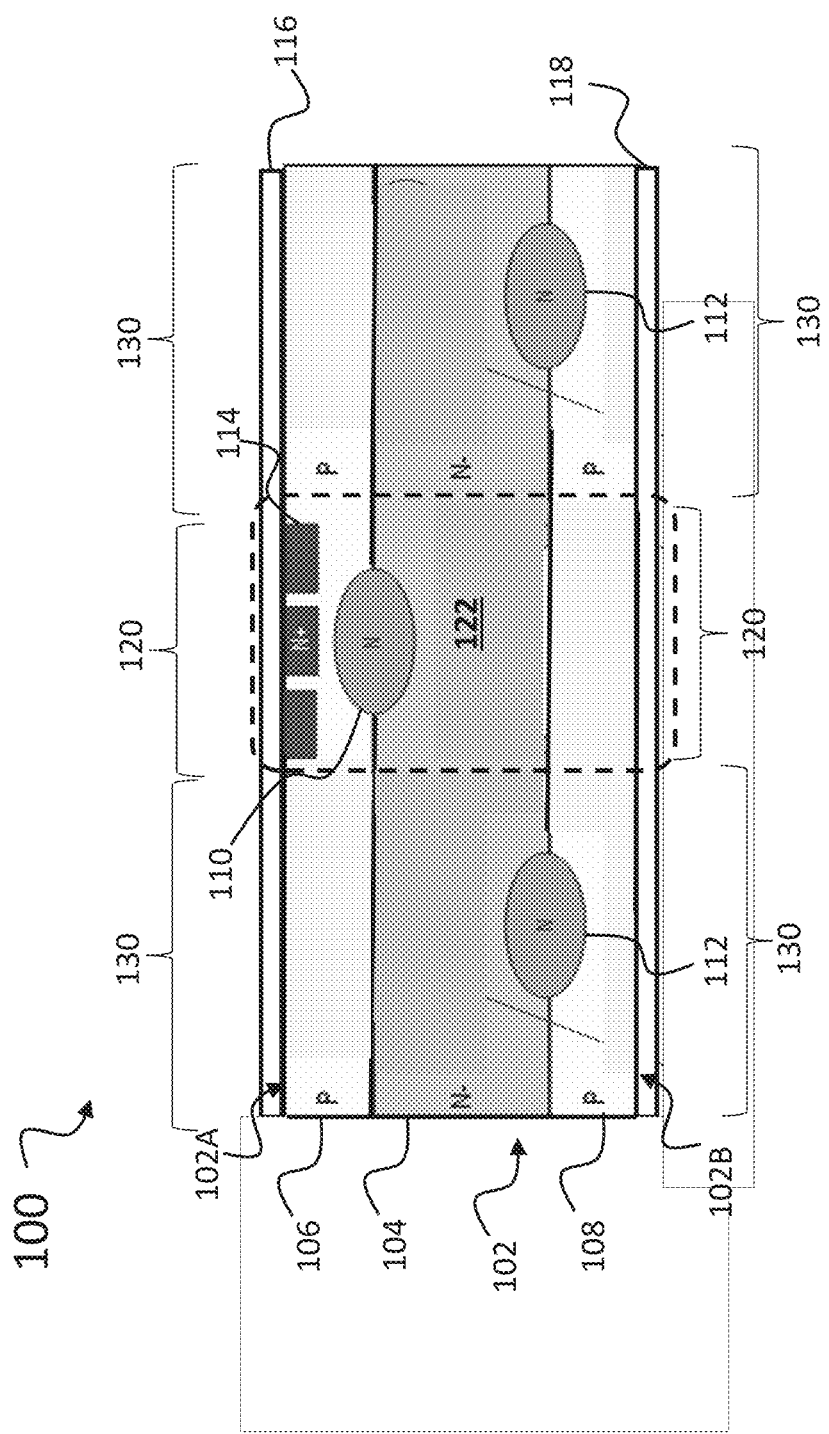
FIG. 1 presents a side cross-sectional view of a structure of a surge protection device according to embodiments of the disclosure.

The present embodiments will now be described more fully hereinafter with reference to the accompanying drawings, in which various embodiments are shown. The embodiments may be embodied in many different forms and are not to be construed as limited to the embodiments set forth herein. These embodiments are provided so that this disclosure will be thorough and complete, and will fully convey the scope of the embodiments to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate when two or more elements are in direct physical contact with one another. The terms "on,", "overlying," "disposed on," and over, may also mean when two or more elements are not in direct contact with one another. For example, "over" may mean when one element is above another element and not in contact with another element, and may have another element or elements in between the two elements. Furthermore, the term "and/or" may mean "and", it may mean "or", it may mean "exclusive-or", may mean "one", may mean "some, not all", may mean "neither", and/or it may mean "both." The scope of claimed subject matter is not limited in this respect.

The present embodiments are generally related to surge protection devices. In various embodiments, a surge protection device is provided that combines a clamping device with a semiconductor crowbar device, or simply "crowbar device". As detailed below, in various embodiments, a clamping device and crowbar device are integrated into a common semiconductor die to generate an asymmetric bidirectional surge protection device. In particular embodiments, a crowbar device and clamping device are arranged in a single semiconductor die a manner that improves surge balance and overall capability for the asymmetric protection device.

FIG. 1 presents a side cross-sectional view of a structure of a surge protection device according to embodiments of the disclosure. The surge protection device 100 of FIG. 1 is formed within a semiconductor die 102, such as silicon. The surge protection device 100 includes a crowbar device 122 (the structure within the dashed line), arranged in a first area 120 of the semiconductor die 102, a clamping device, arranged in a second area 130 of the semiconductor die 102, in a manner where the second area 130 surrounds the first area 120, as detailed with respect to FIG. 2A and FIG. 2B. As illustrated in FIG. 1, the crowbar device 122 is a four layer device that includes an inner substrate layer 104, comprising a first polarity, such as an N⁻ layer in the embodiment pictured. The surge protection device 100 and crowbar device 122 also includes a first outer layer 106, disposed between a first main surface 102A of the semiconductor die 102 and the inner substrate layer 104. The first outer layer 106 is formed of a second polarity, such as a P layer. The surge protection device 100 and crowbar device 122 also includes a second outer layer 108, disposed between a second main surface 102B of the semiconductor die 102, and the inner substrate layer 104, the second outer layer 108 comprising the second polarity, again a P layer for the embodiment of FIG. 1. The surge protection device 100 and crowbar device 122 also includes a surface layer 114, comprising the first polarity. As shown in FIG. 1, the surface layer 114 is disposed within the first area 120, and serves to define the area that forms the crowbar device 122. In this example, the surface layer 114 is an N⁺ layer that may be continuous, or may be patterned into a plurality of sections, depending upon the exact properties of the crowbar device 122 desired.

In some embodiments, as pictured in FIG. 1, the surge protection device 100 may include a first buried region 110, disposed in the first area 120, between (meaning overlapping the interface between) the inner substrate layer 104 and the first outer layer 106, as well as a second buried region 112, disposed in the second area 130, between the inner substrate layer 104 and the second outer layer 108. Note that that first buried region 110 and second buried region 112 are formed to the first polarity, in this example, N-doped regions. In some non-limiting examples, the P-dopant concentration of the first outer layer 106 and second outer layer 108 may be such that the resistance of these layers is in a range of 10 Ohm/sq to 200 Ohm/sq, with a thickness of these layers ranging between 10 μm to 100 μm. In some non-limiting examples, the N-dopant concentration of the inner substrate layer 104 may be such that the resistance of this layer is in a range of 10 Ohm-cm to 200 Ohm-cm, with a thickness of these layers ranging between 150 μm to 350 μm. In some non-limiting examples, the N-dopant concentration of the first buried region 110 and second buried region 112 may be such that the resistance of these layers is in a range of 1 Ohm/sq to 50 Ohm/sq, with a thickness of these layers ranging between 10 μm to 100 μm. In some non-limiting examples, the N-dopant concentration of the surface layer 114 may be such that the resistance of this layer is in a range of 1 Ohm/sq to 50 Ohm/sq, with a thickness of these layers ranging between 10 μm to 100 μm.

Note that a first contact 116 is disposed on the first main surface 102A over the first area 120 and the second area 130 and a second contact 118 is disposed on the second main surface 102B over the first area 120 and the second area 130. As such, in the embodiment of FIG. 1, a clamping device is formed in the area of the substrate (semiconductor die 102) that lies outside of the first area 120.

Figure 2A:
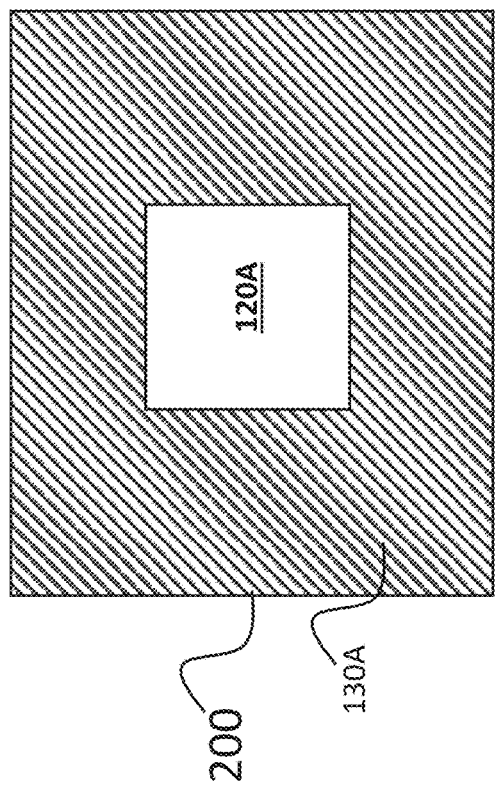
FIG. 2A presents a top plan view of a variant of the surge protection device of FIG. 1.
Figure 2B:
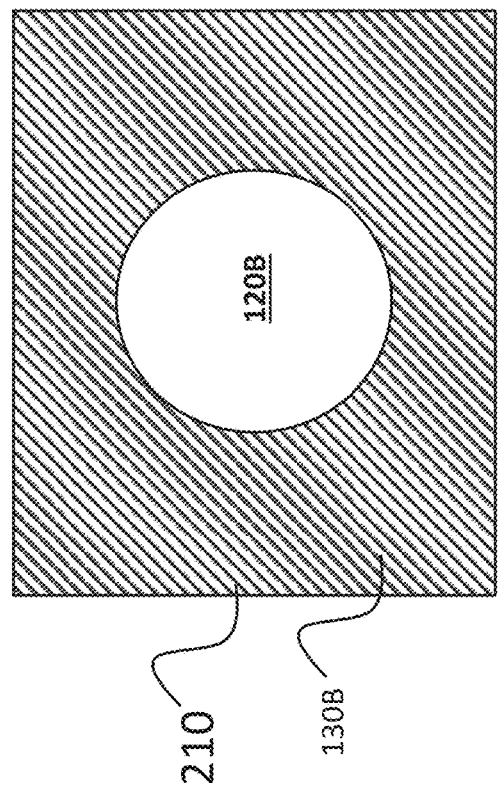
FIG. 2B presents a top plan view of another variant of the surge protection device of FIG. 1.

FIG. 2A presents a top plan view of a variant of the surge protection device 100 of FIG. 1, while FIG. 2B presents a top plan view of another variant of the surge protection device of FIG. 1. The surge protection device 200 includes a first area 120A having the shape of a rectangle or square, while the second area 130A has the shape of a rectangular ring that surrounds the first area 120A. The surge protection device 210 includes a first area 120B having the shape of a circle or ellipse, while the second area 130B has the shape of a ring that surrounds the first area 120B with an inner curved border and outer rectangular border. In either embodiment, the first area (120A, 120B) is surrounded by the respective second area (130A, 130B). According to various embodiments of the disclosure the second area, such as second area 130A or second area 130B, is larger than the first area, such as first area 120A or first area 120B, respectively.

Note that, while in the aforementioned embodiments, the surge protection devices are said to contain a 'crowbar device' and a 'clamping device,' these 'devices' may also be referred to as a 'crowbar region' and a 'clamping region' within a common surge protection device that provides both crowbar functions and clamping functions within a single semiconductor die.

While the aforementioned embodiments shown elliptical or rectangular representations of a first area where a crowbar device is formed within a semiconductor die, in other embodiments, the shape of the area of the crowbar device may be polygonal (non-rectangular), or other suitable shape. Generally, the first area of the crowbar device will be located such that an entire perimeter of the area of the crowbar device is located within a surrounding area that forms the clamping device. Said differently, in various embodiments, the area that defines the crowbar device will not border an edge of a semiconductor die containing the surge protection device.

Figure 3:
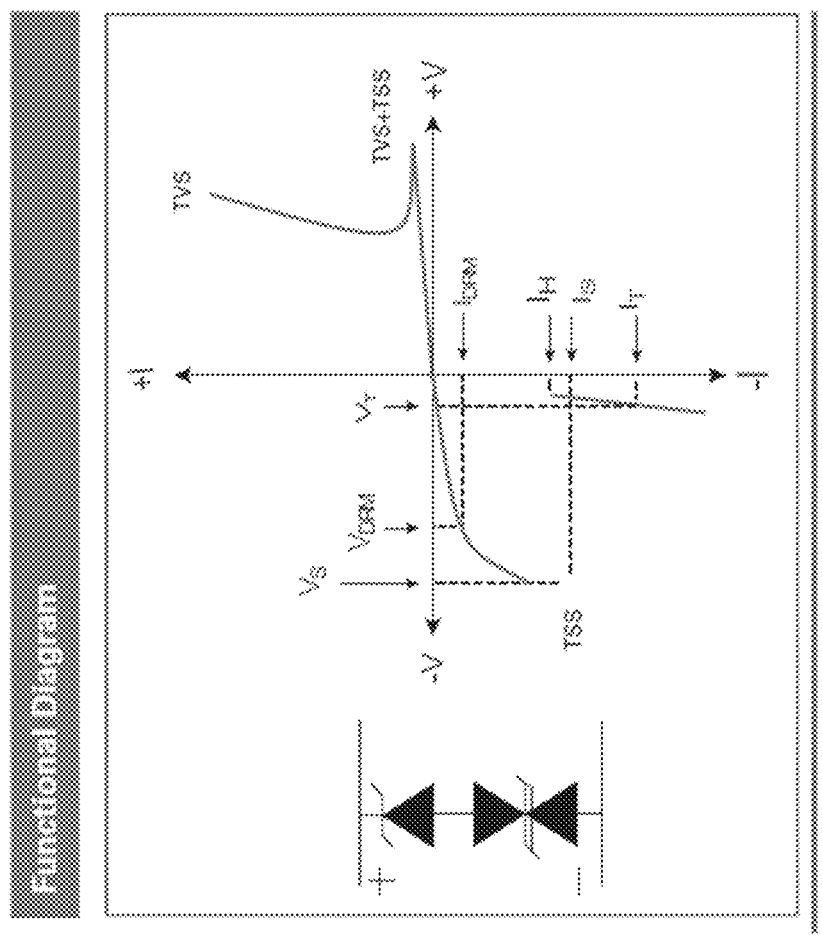
FIG. 3 presents an exemplary current-voltage curve for embodiment of a surge protection device.

In operation, the surge protection devices 100, 200, or 220 may generally behave as depicted in FIG. 3, which figure presents an exemplary current-voltage curve for embodiments of a surge protection device, according to the present disclosure.

Figure 4:
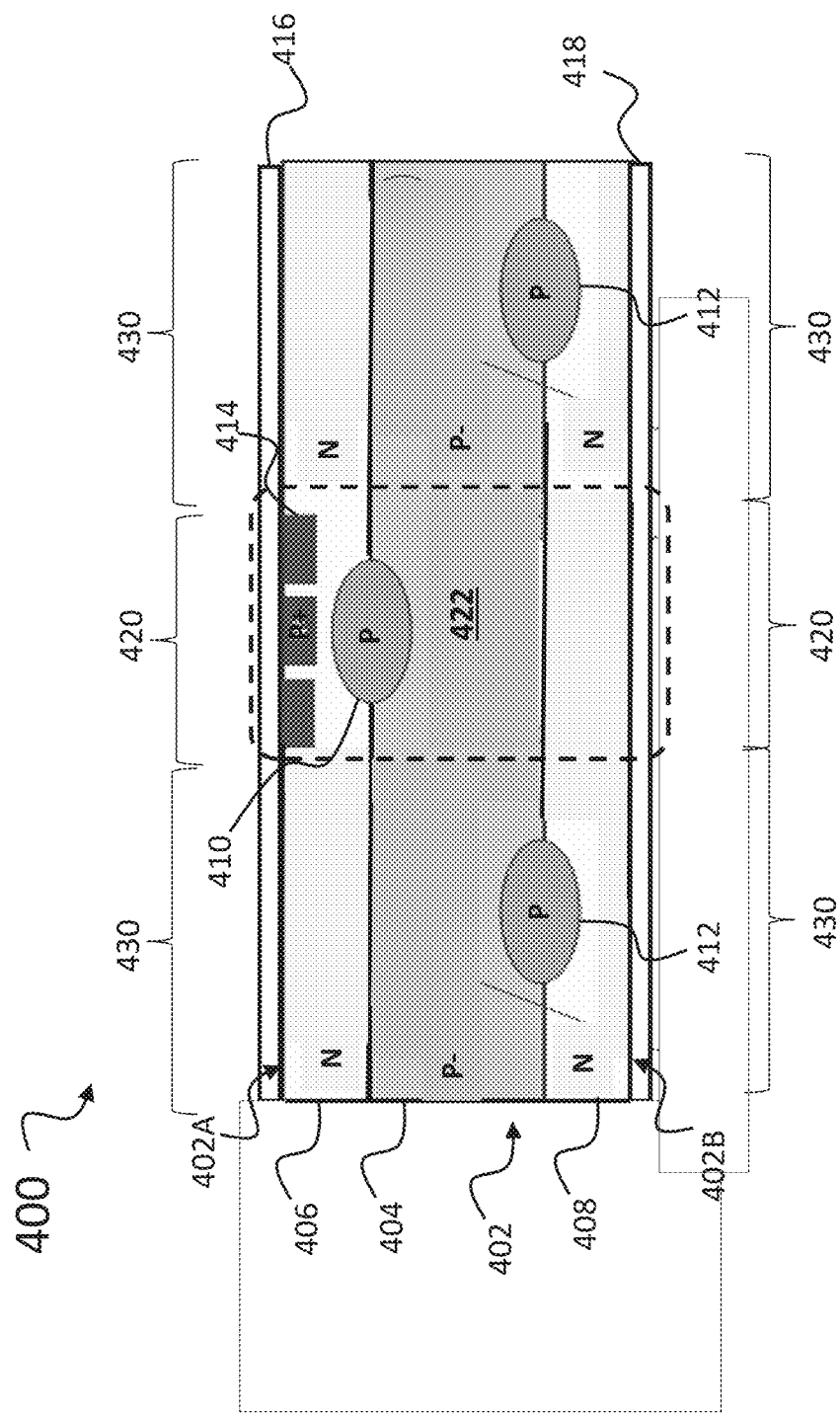
FIG. 4 presents a side cross-sectional view of a structure of another surge protection device according to embodiments of the disclosure.

FIG. 4 presents a side cross-sectional view of a structure of a surge protection device according to other embodiments of the disclosure. The surge protection device 400 of FIG. 4 is formed within a semiconductor die 402, such as silicon. Like the embodiment of FIG. 1, the surge protection device 400 includes a crowbar device 422 (the structure within the dashed line), arranged in a first area 420 of the semiconductor die 402, a clamping device, arranged in a second area 430 of the semiconductor die 402, in a manner where the second area 430 surrounds the first area 420, such as shown in FIG. 2A and FIG. 2B. As illustrated in FIG. 4, the crowbar device 422 is a four layer device that includes an inner substrate layer 404, comprising a first polarity, such as an P⁻ layer in the embodiment pictured. The surge protection device 400 and crowbar device 422 also includes a first outer layer 406, disposed between a first main surface 402A of the semiconductor die 402 and the inner substrate layer 404. The first outer layer 406 is formed of a second polarity, such as a N layer. The surge protection device 400 and crowbar device 422 also includes a second outer layer 408, disposed between a second main surface 402B of the semiconductor die 402, and the inner substrate layer 404, the second outer layer 408 comprising the second polarity, again a N layer for the embodiment of FIG. 4. The surge protection device 400 and crowbar device 422 also includes a surface layer 414, comprising the first polarity. As shown in FIG. 4, the surface layer 414 is disposed within the first area 420, and serves to define the area that forms the crowbar device 422. In this example, the surface layer 414 is an P⁺ layer that may be continuous, or may be patterned into a plurality of sections, depending upon the exact properties of the crowbar device 422 desired.

In some embodiments, as pictured in FIG. 4, the surge protection device 400 may include a first buried region 410, disposed in the first area 420, between (meaning overlapping the interface between) the inner substrate layer 404 and the first outer layer 406, as well as a second buried region 412, disposed in the second area 430, between the inner substrate layer 404 and the second outer layer 408. Note that that first buried region 410 and second buried region 412 are formed to the first polarity, in this example, P-doped regions.

In some non-limiting examples, the N-dopant concentration of the first outer layer 406 and second outer layer 408 may be such that the resistance of these layers is in a range of 10 Ohm/sq to 200 Ohm/sq, with a thickness of these layers ranging between 10 µm to 100 µm. In some non-limiting examples, the P-dopant concentration of the inner substrate layer 404 may be such that the resistance of this layer is in a range of 10 Ohm-cm to 200 Ohm-cm, with a thickness of these layers ranging between 150 µm to 350 µm. In some non-limiting examples, the P-dopant concentration of the first buried region 410 and second buried region 412 may be such that the resistance of these layers is in a range of 1 Ohm/sq to 50 Ohm/sq, with a thickness of these layers ranging between 10 µm to 100 µm. In some non-limiting examples, the P-dopant concentration of the surface layer 414 may be such that the resistance of this layer is in a range of 1 Ohm/sq to 50 Ohm/sq, with a thickness of these layers ranging between 10 µm to 100 µm.

Note that a first contact 416 is disposed on the first main surface 402A over the first area 420 and the second area 430 and a second contact 418 is disposed on the second main surface 402B over the first area 420 and the second area 430. As such, in the embodiment of FIG. 4, a clamping device is formed in the area of the substrate (semiconductor die 402) that lies outside of the first area 420.

Note that while in the aforementioned embodiments, a buried layer is included in the devices, such as buried regions 110, 112, 410, 412. Such buried layers may be appropriate for low voltage applications (<15V), and medium voltage applications (15V to 76 V), while for some high voltage applications, the buried regions (110, 112, 410, 412) may be omitted. Otherwise such device structures with no buried layers may be arranged similarly to the embodiments of FIG. 1 and FIG. 4, where a crowbar device is arranged in a first area that is surrounded by a clamping device, arranged in a second area, around the first area.

In sum, the present embodiments provide a composite device arranged as an asymmetric bidirectional surge protection device that includes a crowbar region or crowbar device in a first area of a semiconductor die, and a clamping region or clamping device in a second area of the semiconductor die that surrounds the first area. The advantage of this novel arrangement is that the impulse surge balance is improved and overall capability of the asymmetric protection device is improved.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments may not be limited to the described embodiments, and have the full scope defined by the language of the following claims, and equivalents thereof.

What is claimed is:

1. A surge protection device, comprising:
   a crowbar device formed in a first area of a semiconductor die; and
   a clamping device formed in a second area of the semiconductor die, the clamping device comprising a clamping device region configured to clamp voltage independently of the crowbar device,
   wherein the second area is larger than and completely surrounds the first area, and wherein the arrangement of the crowbar device and the clamping device is configured to improve impulse surge balance and overall energy dissipation capability of the surge protection device.

2. The surge protection device of claim 1, wherein a shape of the first area is rectangular, elliptical, or polygonal.

3. The surge protection device of claim 1, wherein the crowbar device is a four layer device.

4. The surge protection device of claim 1, comprising:
   an inner substrate layer, comprising a first polarity;
   a first outer layer, disposed between a first main surface of the semiconductor die and the inner substrate layer, the first outer layer comprising a second polarity;
   a second outer layer, disposed between a second main surface of the semiconductor die, and the inner substrate layer, the second outer layer comprising the second polarity; and
   a surface layer, comprising the first polarity, the surface layer being disposed within the first area.

5. The surge protection device of claim 4, further comprising:
   a first buried region, disposed in the first area, between the inner substrate layer and the first outer layer; and
   a second buried region, disposed in the second area, between the inner substrate layer and the second outer layer,
   wherein the first buried region and the second buried region comprise the first polarity.

6. The surge protection device of claim 4, wherein:
   the inner substrate layer comprises an N− layer;
   the first outer layer and the second outer layer comprise a first P layer and a second P layer, respectively; and
   the surface layer comprises an N+ layer.

7. The surge protection device of claim 4, wherein:
   the inner substrate layer comprises an P− layer;
   the first outer layer and the second outer layer comprise a first N layer and a second N layer, respectively; and
   the surface layer comprises an P+ layer.

8. The surge protection device of claim 4, further comprising:
   a first contact, disposed on the first main surface over the first area and the second area; and
   a second contact disposed on the second main surface over the first area and the second area.

9. The surge protection device of claim 1, wherein the second area is larger than the first area.

10. An asymmetric bidirectional surge protection device, comprising:
    an inner substrate layer, arranged within a semiconductor die, the inner substrate layer, comprising a first polarity;
    a first outer layer, disposed between the inner substrate layer and a first main surface of the semiconductor die, the first outer layer comprising a second polarity;

a second outer layer, disposed between a second main surface of the semiconductor die, and the inner substrate layer, the second outer layer comprising the second polarity; and a surface layer, comprising the first polarity, the surface layer being disposed on the first main surface within a first area of the semiconductor die, wherein the surface layer defines the first area of the semiconductor die as a crowbar device region, and a second area of the semiconductor die surrounds the first area and defines a clamping device region, the clamping device region being distinct from the crowbar device region and configured to clamp voltage independently of the crowbar device, wherein the second area is larger than the first area and the asymmetric arrangement is configured to improve impulse surge balance and overall surge-handling capability.

11. The asymmetric bidirectional surge protection device of claim 10, wherein a shape of the first area is rectangular, elliptical, or polygonal.

12. The asymmetric bidirectional surge protection device of claim 10, wherein the crowbar device is a four layer device.

13. The asymmetric bidirectional surge protection device of claim 10, further comprising:

a first buried region, disposed in the first area, between the inner substrate layer and the first outer layer; and a second buried region, disposed in the second area, between the inner substrate layer and the second outer layer, wherein the first buried region and the second buried region comprise the first polarity.

14. The asymmetric bidirectional surge protection device of claim 10, wherein:

the inner substrate layer comprises an N− layer;

the first outer layer and the second outer layer comprise a first P layer and a second P layer, respectively; and the surface layer comprises an N+ layer.

15. The asymmetric bidirectional surge protection device of claim 10, wherein:

the inner substrate layer comprises an P− layer;

the first outer layer and the second outer layer comprise a first N layer and a second N layer, respectively; and the surface layer comprises an P+ layer.

\* \* \* \* \*